June 10, 1952 R. A. ROBINSON ET AL 2,599,583
METHOD AND APPARATUS FOR TESTING SUSPENSIONS
Filed Nov. 15, 1946 3 Sheets-Sheet 1

INVENTORS.
ROBERT A. ROBINSON
WILLIAM F. EBERZ
BY THEIR ATTORNEYS.
HARRIS, KIECH, FOSTER & HARRIS
BY
*Clarence F. Kiech*

June 10, 1952     R. A. ROBINSON ET AL     2,599,583
METHOD AND APPARATUS FOR TESTING SUSPENSIONS
Filed Nov. 15, 1946     3 Sheets-Sheet 2
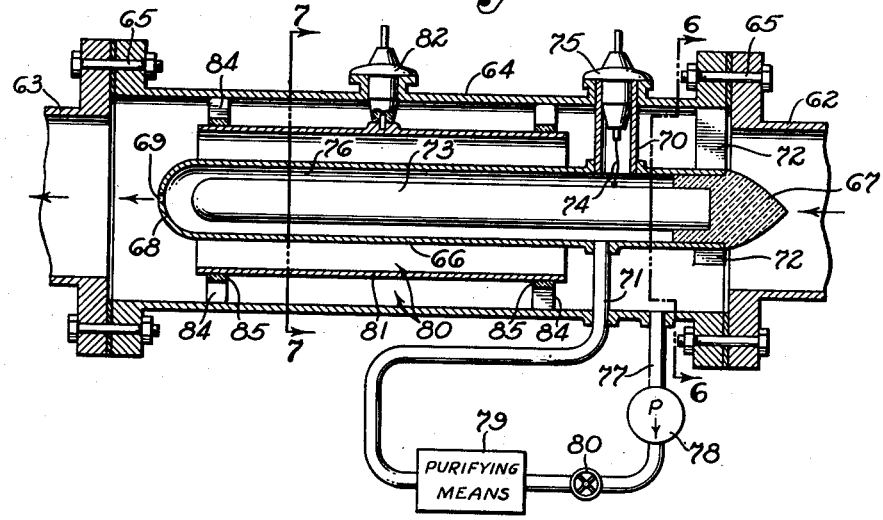
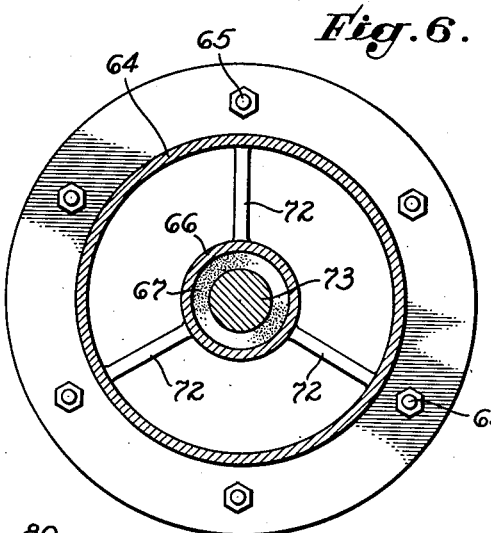
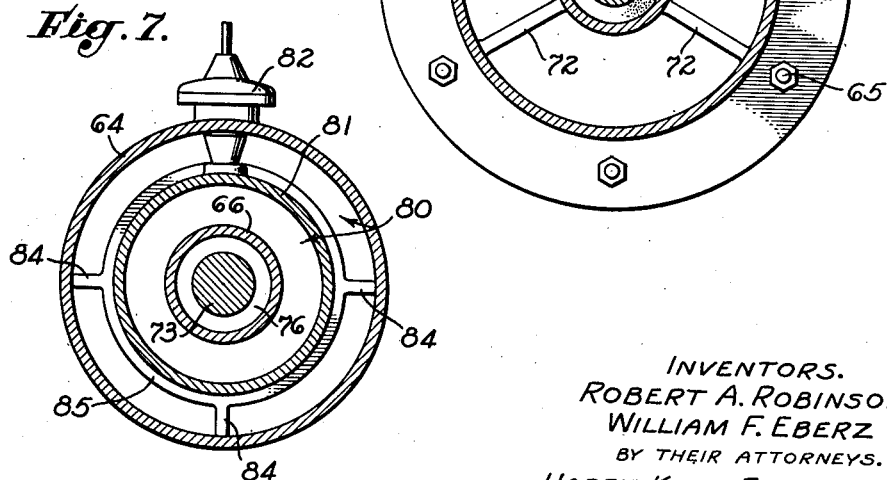
INVENTORS.
ROBERT A. ROBINSON
WILLIAM F. EBERZ
BY THEIR ATTORNEYS.
HARRIS, KIECH, FOSTER & HARRIS

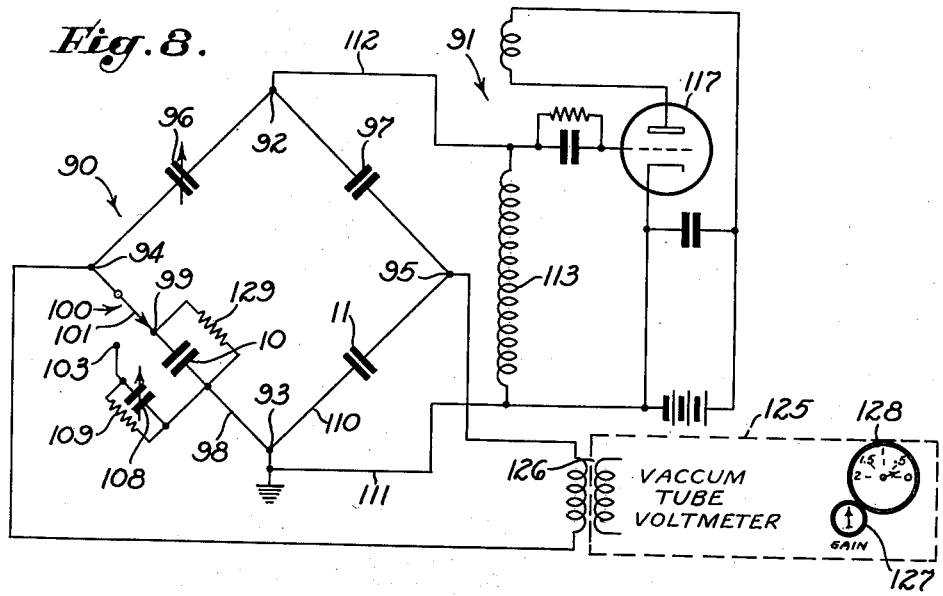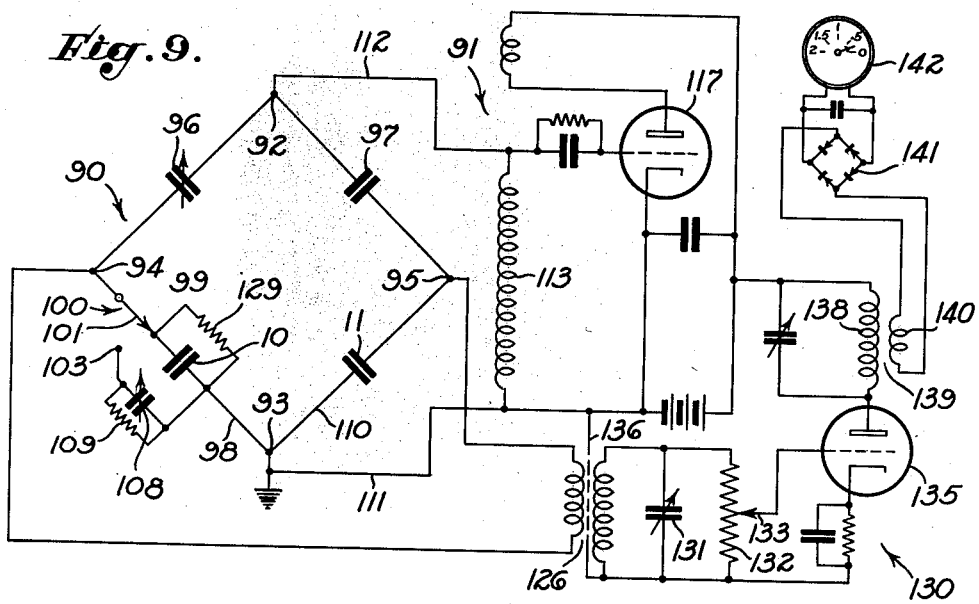

Patented June 10, 1952

2,599,583

UNITED STATES PATENT OFFICE 2,599,583

METHOD AND APPARATUS FOR TESTING SUSPENSIONS

Robert A. Robinson, Long Beach, and William F. Eberz, Altadena, Calif., assignors to Petrolite Corporation, Ltd., Wilmington, Del., a corporation of Delaware Application November 15, 1946, Serial No. 709,948

12 Claims. (Cl. 175—183)

Our invention relates to the quantitative measurement of the dispersed phase of an oil-continuous suspension, typically an oil-continuous emulsion. It will be exemplified as a method and apparatus for indicating small amounts of dispersed or suspended aqueous material in a petroleum oil, although it can also be used for measuring the amount of suspended materials in vegetable oils or in any liquid of relatively high resistivity.

In the petroleum industry, by way of example, it is very desirable to know the aqueous content of water-in-oil type emulsions. Strict maximum limits are often prescribed or desirable as to the amount of aqueous material in a crude oil to be transmitted by pipe line, in the effluent from desalting or dehydration plants, and in various refinery streams. Present practice is to centrifuge a sample, with or without prior dilution, in order to throw down the aqueous material, or to measure the aqueous content of a sample by distillation methods. These are batch operations, quite time-consuming and troublesome.

It is an object of the present invention to provide a new process and apparatus, capable of continuous operation if desired, for the accurate and simple determination of the amount of suspended material in oils.

We have found that the change in dielectric constant of an oil with change in the amount of suspended material therein is an excellent reliable criterion for determining the amount of such suspended material present. It is an important object of the invention to provide a method and apparatus utilizing this principle.

On petroleum oils, for example, the dielectric constant of the oil, when dry, will be in the neighborhood of 2.1–2.2, varying somewhat with different oils. When the oil has a water content of 1% the dielectric constant will be raised by about 0.1 unit, and with higher water contents the dielectric constant will be raised even more.

In the measurement of dielectric constant, it is desirable to use high frequency potentials to increase the ratio of capacitive to resistive current. The desirable frequency is such that its generation by an electron-tube oscillator is preferable. We prefer a frequency of 100,000 cycles up to several megacycles, e. g., as high or higher than 6 mc. The lowest frequency of the range is preferably that which causes the parallel capacitive reactance of the oil-containing cell to be of the order of $\frac{1}{20}$–$\frac{1}{100}$ of the effective parallel resistance of the cell; the term "effective resistance" being used to include all dielectric or other power-consuming losses. The highest frequency of the range is limited only be design considerations, frequencies above about 6 mc. giving difficulty in balancing or through increased dielectric or stray losses and from inductance of long leads, ground wires, etc. Within a narrower range of 500,000 cycles to 3 mc. will be found the frequency giving most satisfactory results on most petroleum oils.

Our tests have shown that there are no insurmountable problems in such measurement due to frequency, temperature or voltage coefficients. In using a balanced capacity bridge for the measurement, minor changes in frequency or voltage do not significantly change the accuracy.

However, one of the most pressing problems in the art is the testing of low water-content oils of 0.1–1.0% and the herein-exemplified apparatus has been designed particularly for testing such oils. In this instance, temperature variations become very significant and the invention has as one of its objects the use of a compensating cell for compensating for changes in temperature and, in some instances, for changes in type or source of oil being tested.

While the output of a suitable substantially-constant-frequency oscillator may be applied across one diagonal of the bridge, such a system requires a high-output oscillator, often makes the equipment unduly bulky and not portable, and requires careful impedance matching subject to decoupling. We have found it advantageous to dispose the oil-containing test cell, preferably connected in a bridge circuit, in the tank circuit of the oscillator. This gives a relatively stable voltage across the cell, permits the use of a single-tube oscillator of simple design and avoids coupling difficulties. The frequency of the oscillator shifts slightly with change in the di-electric constant, but this shift is so small as to have no substantial significance, usually being less than .05%.

It is an object of the invention to employ a capacity bridge connected to an oscillator in the determination of the amount of suspended material in oils.

Another object is to dispose the oil in a suitable cell and to connect this cell in the tank circuit of an oscillator to produce an indication of the amount of suspended material in an oil.

A further object is to provide an apparatus including a meter or other device on which the content of suspended material can be directly read or recorded.

Further objects lie in the provision of a novel bridge circuit including balancing means and check means for periodically checking the accuracy of the indication.

Other objects of the invention include the provision of a novel cell for the oil including, if desired, an auxiliary compensating cell; a novel cell through which oil may be circulated continuously; and a cell-including structure capable of direct connection to existing pipe lines.

It is another object, to provide an electronic device for measurement of water content of oils which is not influenced by particle size or degree of emulsification.

We have further discovered that, once the invention is balanced and calibrated for a particular oil, any new oil of similar type can be tested without recalibration, contrary to the apparent necessity for recalibration when different oils are tested. In this connection, if the instrument has been calibrated on the basis of a first oil, dry or of known water content, the only re-setting required for a second oil can be made by thoroughly dehydrating the second oil to zero water content, and setting the meter to read zero water content when this oil is in the test cell. Alternatively, the compensating cell of the invention can be filled with a dry sample of the oil to be tested, no re-setting then being necessary. The second oil, of any water content within the range of the meter, can then be inserted in or flowed through the test cell and the meter will directly indicate its water content with substantial accuracy, without resort to calibration charts, different meter scales, etc. It is an object of the invention to provide a method of testing oils by this procedure and an apparatus making possible the testing of different oils with a minimum of adjustments.

A further object is to provide an apparatus for the continuous testing of oils in which a small stream of the oil is dehydrated and flowed through a compensating cell.

Still further objects and advantages of the invention will be apparent to those skilled in the art from the herein-contained description of exemplary embodiments.

Referring to the drawings:

Fig. 1 is a vertical sectional view of one cell structure of the invention.

Figs. 2 and 3 are horizontal sectional views of the cell structure of Fig. 1, taken respectively along lines 2—2 and 3—3 thereof.

Fig. 5 is a vertical sectional view of a third cell structure of the type suitable for interposition in existing pipe lines.

Figs. 6 and 7 are vertical sectional views taken as indicated by the lines 6—6 and 7—7, respectively, of Fig. 5.

Figs. 8 and 9 show alternative wiring diagrams of circuits of the invention.

Figure 1:
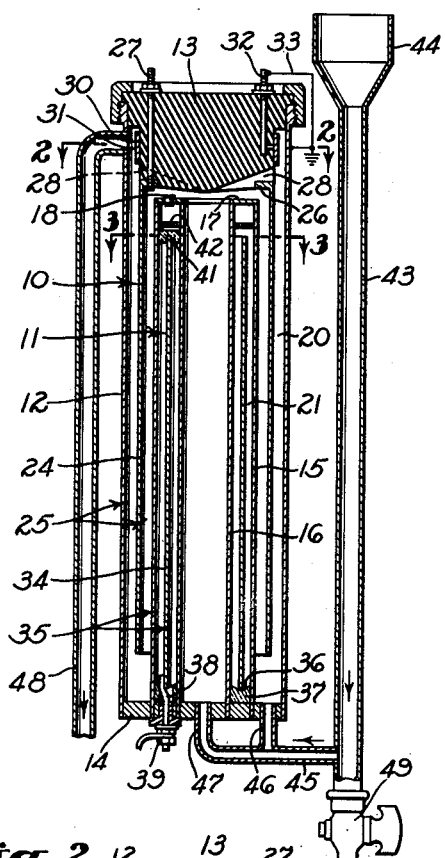

Referring particularly to Fig. 1, the illustrated cell structure comprises, generally speaking, a capacitive measuring or test cell 10 and a capacitive compensating cell 11. The cell structure provides a receptacle for these cells, shown as comprising a cylindrical casing 12 closed at its upper end by a removable insulator 13 and at its lower end by a bottom wall 14.

Grounded to and extending upward from the bottom wall 14 are cylindrical walls 15 and 16 concentric with each other and with the vertical axis of the cylindrical casing 12. To close the space between the walls 15 and 16, an annular member 17 is secured to the upper ends of these walls. This member may provide a filling opening normally closed by a plug 18.

The cylindrical wall 15 divides the interior of the casing 12 into two adjacent compartments. These include a first compartment 20 between the cylindrical casing 12 and the wall 15 and a second compartment 21 between the cylindrical walls 15 and 16. The second compartment is closed by the annular member 17 in this embodiment and is adapted to be initially filled with a dry oil before the cell is completely assembled.

Extending downwardly in the first compartment 20 is a sleeve electrode 24 forming a part of the test cell 10, the electrode being preferably disposed substantially midway between the casing 12 and the cylindrical wall 15. The electrode 24 is in effect a live electrode for the test cell 10 and divides the first compartment into two concentric passages or chambers, collectively termed a test space 25, adapted to receive the oil to be tested.

The upper end of the electrode 24 provides an inwardly extending flange 26 secured by bolts 27 to the insulator 13, one of the bolts serving as an input terminal for the electrode. The lower portion of the insulator provides a plurality of slanting, radially-disposed slots 28 starting at a central apex of the insulator and forming upwardly inclined passages through which liquid, air or released gas may flow past the flange 26 from the space between the electrode 24 and the cylindrical wall 15 to the outlet of the cell structure during filling or use thereof. The electrode flange engages ridges between the slots 28 and the inclined nature of the passages formed by the slots 28 prevents any accumulation of air or gas within the electrode 24. The insulator 13 preferably provides a cylindrical portion 30 surrounded by a metallic ring 31 which is electrically grounded through a stud 32 connected to a grounded conductor 33 which is connected also to the cylindrical casing 12.

Likewise, a sleeve electrode 34 is disposed centrally in the second compartment 21 and divides same into two passages or chambers collectively termed an oil space 35 of the compensating cell 11, this space being adapted to receive a sample of oil containing substantially no suspended material, e. g., a dry oil. The electrode 34 is electrically insulated from the cylindrical walls 15 and 16. For example, the lower end of the electrode 34 may rest in an annular groove 36 of a ring-shaped insulator 37 resting on the bottom wall 14 and providing a passage for receiving a conductor 38 electrically connecting the electrode 34 with a terminal 39. To insure fixed spacing of the upper end of the electrode 34 relative to the cylindrical walls 15, 16 three or more grooved insulators 41 may be employed, each insulator being dimensioned to fit snugly between the walls 15, 16 and providing a bottom groove to receive the upper end of the electrode 34.

Electrically bounding the upper end of the oil space 35, we prefer to use an annular interstitial member 42, usually a perforated disc of metal, connected to the cylindrical walls 15 and 16 to be at ground potential. The annular member is spaced from the upper end of the sleeve electrode 34 and preferably above the insulators 41 which may be secured thereto.

The test space 25, bounded by the grounded casing 12, the cylindrical wall 15 and the live electrode 24, forms a test cell capacitance means. In effect, the cylindrical bounding members comprise condenser plates separated by the oil in the test space and the capacitance between the live electrode 24 and the grounded walls will be a function of the dielectric constant of this oil. Likewise, the oil space 35, bounded by the walls 15, 16 and the live electrode 34, forms another capacitance means comprising in effect a part of a temperature compensating means for compensating for change in capacitance of the oil in the test space with change in temperature and a means for compensating for dielectric constant difference between various oils. The dielectric constant of the oil in the oil space 35 determines the capacitive reactance of the temperature-compensating cell 11, formed by the walls 15, 16 and the intervening live electrode 34.

It is important to the invention, if designed for maximum accuracy, that the oil space 35 be in heat-transferring relationship with the test space 25 so that the oils in the cells 10 and 11 shall be at substantially the same temperature. It will be observed that the two spaces are separated by the cylindrical wall 15 which, being relatively thin and a relatively good conductor of heat, facilitates heat transfer between the two spaces. In addition, the space inside the cylindrical wall 16 is also filled with a portion of the same oil as fills the test space 25 wherefore the oil space 35 and, in fact, the entire compensating cell 11 is substantially completely surrounded by the oil undergoing test. By this construction, the oil in the compensating cell 11 and in the oil space 35 thereof is automatically maintained at the same temperature as the oil undergoing test in the test cell 10.

In the cell structure of Fig. 1, a suitable fluid conducting means communicates with the test space 25. Preferably this means includes an inlet means shown as a stand pipe 43 having a funnel 44 into which the oil to be tested may be poured, this oil flowing through a side pipe 45 and dividing between two branch pipes 46 and 47. The branch pipe 46 communicates with the lower end of the test space 25 and the branch pipe 47 communicates with the lower interior of the cylinder formed by wall 16. Oil entering through these pipes rises in the casing 12 to an overflow pipe 48 which preferably opens on an equipotential or fieldless annular space between the grounded casing 12 and the grounded ring 31. The position of the overflow pipe 48 determines the maximum level of the oil in the casing 12 and, in the embodiment illustrated, provides a small gas space around the ring 31 above the surface of the oil. It is desirable that this oil surface be in an equipotential space and that there be no electric field to this oil surface. The grounded ring 31 prevents any field from the energized bolt 27 to the casing 12 in the zone around the ring and provides an equipotential space for the surface of the oil. Should any gas bubble rise from the oil in the test space it will be guided into the equipotential space and be vented through the overflow pipe 48 so as not to change the position of the oil surface nor the capacitive reactance of the oil-gas system in the upper portion of the casing 12. It should be understood, however, that it is not always necessary to provide a gas space or pocket in the upper end of the casing 12. This is particularly true if a stream of the oil to be tested flows continuously through the test space 25 and if the overflow pipe or outlet is at the extreme upper end of the casing 12.

The cell shown in Fig. 1 can be used for batch or continuous testing. In the former event, the oil to be tested may be poured into the funnel 44 until it overflows through the pipe 48, later drainage being effected by opening a pet cock 49 at the lower end of the pipe 43. In the latter event, a stream of the oil to be tested may continuously enter the funnel 44 and flow tranquilly upward through the test space 25. In either event the oil trapped in the oil space 35 will be brought to the same temperature as the oil to be tested, due to the heat-transferring relationships previously described.

In the usual practice of the invention, the oil space 35 is filled with an oil containing substantially no suspended material to secure the desired temperature compensating effect. In the embodiment of Fig. 1 this oil is trapped in the oil space, being inserted before the electrode 24 is lowered into place, as by removing the plug 18. In other instances it is desirable that oil free of suspended material be continuously circulated through the oil space 35. The embodiments of Figs. 4 and 5 accomplish this result.

Figure 4:
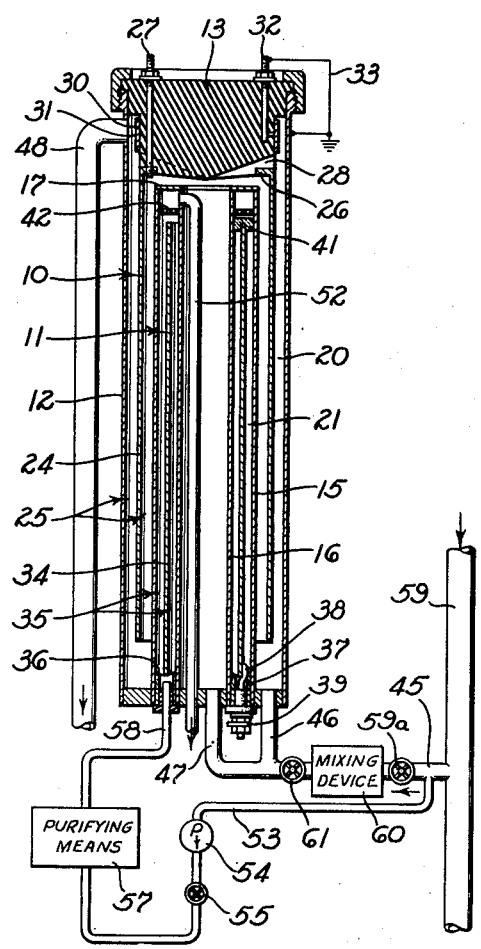
Fig. 4 is a vertical sectional view of an alternative cell structure, particularly suited to continuous testing, and showing diagrammatically some of the connecting piping and auxiliary equipment.
Figure 2:
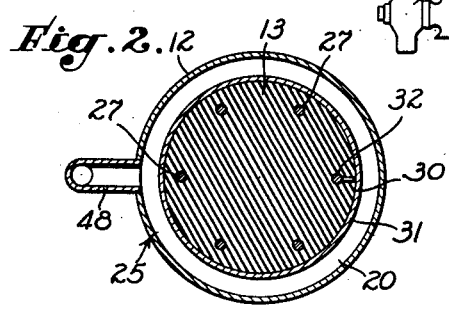
Figure 3:
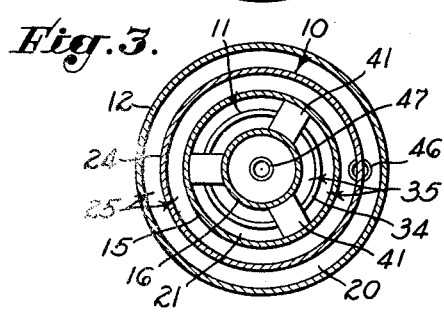

Referring particularly to Fig. 4, the cell structure is similar to that shown in Fig. 1 with the following exceptions. A discharge pipe 52 communicates with and serves as an overflow for the upper end of the oil space 35. A small stream of the oil to be tested is drawn from the side pipe 45 and flows through a small pipe 53 under the action of a small pump 54, the flow being controlled by a valve 55. This flow is delivered to any suitable means for removing from the oil substantially all of the suspended material therein. This means is shown as a purifying means 57 and may be a filter, centrifuge or any other suitable means for removing substantially all of the suspended material. In the exemplified practice of the invention, i. e., the determination of the water content of oils, the purifying means 57 will conventionally be any means for removing substantially all of the suspended water droplets from the oil, e. g., a suitable dehydrator. Various dehydrators are known in the art. In the non-electrical types, the water droplets may be filtered, absorbed or coalesced and separated, sometimes with the aid of chemical deemulsifying agents. In the electrical types the water droplets may be electrically coalesced and separated or, in some instances, electrically precipitated on an electrode surface. Any of these types may be used without departing from the spirit of the invention. The purified oil moves through a pipe 58 communicating with the lower end of the oil space 35 so that a small stream of this oil is continuously delivered thereto, the overflow material being discharged through the pipe 52.

The embodiment of Fig. 4 is well adapted to the testing of an oil flowing along a pipe line 59, with which the pipe 45 communicates, to determine its content of suspended material, e. g., its water content. Only a small sample of the oil to be tested need be withdrawn through the pipe 45, as controlled by a valve 59a, and even a smaller fraction of the oil stream need be handled by the purifying means 57. The major portion of the sample stream will move tranquilly through the test space 25 and the capacitance in the test cell can be compared with the capacitance of the cell through which the purified oil stream is moving, to obtain an indication or record of the amount of suspended material in the oil moving through the pipe line 59.

Occasionally it is found that the emulsion flowing in pipe 59 is of such coarse character that the suspended particles tend to settle out at the low rate of flow obtaining in the cell structure, thus producing an erroneous reading. This can be circumvented by means of a mixing or emulsifying device 60 inserted in the pipe 45 leading to the cell structure. The type of emulsifier necessary to produce a non-sedimenting dispersion will differ with various types of oils, but a small centrifugal pump is generally satisfactory. The rate of flow can be regulated by a valve 61 in the pipe 45 downstream from the emulsifying device 60 which valve can act to give additional emulsification, if the emulsifying device 60 is capable of producing considerable pressure. Thus, it is possible to measure the content of dispersed matter in an oil stream even though it is so coarse that rapid settling out occurs when a sample is placed in a measuring device such as that represented by the invention.

In the embodiment of Fig. 5, the invention is incorporated in an attachment to a pipe line, two flanged sections of which are indicated by the numerals 62 and 63. Disposed therebetween is a flanged casing 64, somewhat larger in diameter than the pipe sections 62 and 63, with its flanges suitably bolted to the flanges of the pipe sections as by bolts 65.

In this embodiment, the compensating cell comprises a cylindrical wall 66 closed at one end by a stream-piercing head 67 formed of insulating material and at its other end by a dome-like member 68 having an exit opening 69. The cylindrical wall 66 is supported centrally within the casing 64 by pipes 70 and 71 and by a spider 72 which are, in turn, attached to the casing. The cylindrical wall 66 is maintained at ground potential. Disposed centrally therein is a live electrode 73 comprising a rod-like member mounted in the insulating material of the head 67 to be insulated from ground. A conductor 74 is electrically connected to the electrode 73 and extends through a bushing 75 inserted into the pipe 70.

The space between the cylindrical wall 66 and the electrode 73 comprises a compartment or oil space 76 of a compensating cell. A small stream of the oil entering the casing 64 is withdrawn through a pipe 77 by means of a pump 78 and enters a purifying means 79 at a flow rate determined by the setting of a valve 80. The purifying means 79 serves the same function as the purifying means 57 previously described and delivers to the pipe 71 a small stream of the oil containing substantially no suspended material. This oil fills the oil space 76 and is discharged through the exit opening 69 to blend with the main oil stream which is pierced by the head 67 to flow through a test space 80 between the cylindrical wall 66 and the casing 64.

The test space 80 comprises essentially two passages formed on opposite sides of a sleeve electrode 81 insulated from the casing 64 and supported coaxially therein by a bushing 82. The electrode 81 is a live electrode corresponding generally to the electrode 24 of Fig. 1. It splits the main stream of the oil into two concentric streams flowing respectively inside and outside the electrode 81. This electrode should be rigidly mounted so as not to vibrate or change its position during this flow of the oil. For this purpose, each end of the electrode 81 may provide several spacers 84 formed of insulating material and shown as extending radially from a ring 85, formed of similar material, surrounding the electrode 81. The outer ends of the spacers 84 engage the inner wall of the casing 64 to maintain the electrode 81 in fixed position.

In the embodiment of Fig. 5 the entire stream flows through the cell structure of the invention. Any change in temperature of the main stream produces a similar change in temperature in the oil space 76 due to the renewal of the oil in this space and to the heat transfer through the cylindrical wall 66 between the oil space 76 and the test space 80.

The invention includes a circuit means for energizing the live electrodes and for, in effect, measuring and balancing against each other the capacitance of the oil space and the test space. Preferably this circuit means includes a capacitance bridge, indicated generally by the numeral 90 of Figs. 8 and 9, and a source of relatively high frequency potential, exemplified in Figs. 8 and 9 as an electron tube oscillator designated generally by the numeral 91.

The capacitance bridge 90 includes a plurality of capacitive arms connected to provide input terminals 92 and 93, representing one diagonal of the bridge, and output terminals 94 and 95, representing another diagonal of the bridge. Condensers 96 and 97 are respectively connected in the upper arms of the bridge. The invention includes means for connecting the electrodes of the test cell 10, for example, in an arm 98 of the bridge. For example, the casing 12 is connected to the grounded input terminal 93 and the electrode 24 is connected to a terminal 99 of a selector switch 100 having an arm 101 connected to the output terminal 94. The switch 100 includes another contact 103 selectively engageable by the arm 101. When the arm 101 engages the contact 103 a variable condenser 108, shunted by a resistor 109, is interposed in the arm 98.

In the circuit shown, the compensating cell 11 is electrically connected in the fourth arm 110 of the bridge, e. g., its grounded walls 15, 16 are connected to the input terminal 93 of the bridge and its electrode 34 is connected through terminal 39 to the output terminal 95 of the bridge.

The oscillator 91 is of the electron tube type and we prefer to make the bridge the tank capacitor by connecting terminals 92 and 93 to conductors 111 and 112, forming a part of the oscillator circuit, there being an inductance 113 connected between the conductors 111 and 112. The remainder of the oscillator 91 is conventional and includes typically a triode 117 connected as a feed-back oscillator.

While various means can be employed for energizing the capacitance bridge at the relatively high frequency previously mentioned, we prefer to dispose the bridge in the tank circuit of an oscillator as this assures that full voltage is always applied to the bridge circuit without the necessity of tuning or impedance matching. With this arrangement, the output frequency of the oscillator may vary a small fraction of 1% with change in balance of the bridge, but the effect of such minor change in frequency is negligible.

The output of the capacitance bridge, appearing between output terminals 94 and 95, is sent to any suitable means responsive to the output, e. g., a means for indicating or recording the mis-balance of the bridge as a measure of the water content of the oil being tested.

Such an ouput means may be merely a sensitive D. C. meter associated with a full wave rectifier as will be later described with reference to Fig. 9. The output means shown in Fig. 8 is a vacuum tube voltmeter 125 with the primary winding of its input transformer 126 connected between the output terminals 94 and 95. Such vacuum tube voltmeters are well known in the art and employ a gain control 127, the output reading being taken from a meter 128 which, in the present invention, is preferably calibrated in units of water content or content of suspended material. With the low-range embodiment of the invention as illustrated, employed for determination of the water content of petroleum products, e. g., crude oil, one end of the meter scale will provide a zero or minimum reading and the other end of the scale will provide a reading corresponding to the maximum water content to be indicated, e. g., 2%.

One procedure to which, however, we do not wish to be limited, for operating such an embodiment of the invention is as follows: The capacities of the measuring and compensating cells 10 and 11 are so balanced that the capacity of cell 10 when it contains an oil having a water content of 2% is equal to the capacity of cell 11 when it contains a dry sample of the same oil. With these two cells at equal capacities under these conditions, the condenser 96 is adjusted so that the meter 128 indicates exact balance (null point). The condensers 96 and 97 are then equal and conditions for a balanced bridge circuit are established which should not vary substantially from one oil to another so long as the same kind of oil, except for water content, is used in both cells 10 and 11. In this way the null point actually represents a 2% water content of the oil in the test cell 10, and the maximum mis-balance represents dry oil. It is of course possible to establish the null point when dry oil is used both in the test cell and the compensating cell. However, particularly when the circuit of Fig. 9 is used, the sensitivity of the system is less in the neighborhood of the null point, due to the characteristics of meter rectifiers and the output characteristic of a capacity bridge, and it is therefore more desirable to use the procedure first described.

After the null point has been established with an oil having 2% water content in the test cell 10, the latter is drained and filled with a sample of dry oil similar to that already in the compensating cell 11. The gain of the vacuum tube voltmeter or amplifier is then adjusted until the meter reads full scale, thus spreading the mis-balance over the full scale range. Condenser 108 and resistor 109 are then adjusted to equal this value in order to retain a standard for recalibration. After draining the test cell 10, it is then ready to receive the sample of oil whose water content is to be determined.

It is desirable that the accuracy of the instrument be checked from time to time because of drifts in amplification, tube deterioration, changes in line voltage, etc. This can be easily done merely by throwing the selector switch to contact 103 and comparing the meter readings with those formerly observed during the calibration.

As previously mentioned, it is desirable to use high frequency energizing potentials to obtain an output which varies almost exclusively with the dielectric constant of the oil. Even then, however, there will be a minute resistive component of the current flowing through the oil in the test cell and the compensating cell. For most accurate results, this resistive component and losses in the bridge and cells are balanced out by a resistor 129 connected in the bridge circuit across the test cell 10 or compensating cell 11 as found necessary. Similar considerations apply to the resistor 109 when establishing a recalibration standard as previously described.

Fig. 9 illustrates another circuit diagram differing from Fig. 8 only in the output means. Here the transformer 126 is an input transformer for one stage of tuned radio frequency amplification, indicated generally as an amplifier 130 including a tuning condenser 131 and a potentiometer 132 connected to the input transformer 126, the potentiometer including a contact 133 comprising a gain control for the grid of a triode 135. In this system it has been found desirable to interpose a grounded shield 136 between the primary and secondary coils of the input transformer 126.

The output from the triode 135 is delivered to a primary winding 138 of a step-down transformer 139 whose secondary winding 140 is connected to a full wave bridge rectifier 141. The rectified output is delivered to a meter 142 which may be a d'Arsonval movement meter and which may be calibrated in terms of water content or content of suspended material.

The embodiment of Fig. 9 is initially calibrated on a dry oil and an oil of known water content, substantially as previously described. The end points or readings on the scale on the meter 142 are adjusted by varying the contact 133 which determines the gain of the amplifier. The equivalent capacitance necessary to obtain full-scale deflection is set up in the condenser 108 for future reference and checking. However, with the rectifier system of Fig. 9 and the output characteristic of a capacity bridge, the sensitivity of the bridge adjacent the null point is lower than when there is an appreciable mis-balance. Therefore, in order to obtain greatest sensitivities at lowest water contents, the null point is preferably made to indicate the higher water contents.

After the initial calibration of the instrument, connected as in Fig. 9, to define the scale limits, the remainder of the scale is calibrated by successively placing oil samples of known intermediate water contents in the cell and determining the corresponding scale deflections. Subsequently, an oil of unknown water content can be placed in the test cell 10 and its water content directly determined.

The arrangement of Fig. 9 can be considerably simplified in an instrument designed to indicate water contents in a higher range, e. g., 1–10% water. In this instance the resistors 109 and 129 may sometimes be eliminated. Even the compensating cell 11 can sometimes be eliminated with satisfactory results, a fixed condenser being employed in the corresponding leg of the bridge circuit. This is possible because temperature changes are not as significant in the higher range as in the range of 0–2%. In addition, the amplifier 130 can often be eliminated, the input of the rectifier 141 being connected directly to points 94 and 95 of the bridge.

Various changes may be made without departing from the spirit of the invention as defined in the appended claims.

We claim as our invention:

1. A method for testing oil-continuous emulsions containing dispersed droplets of liquid to determine the amount of dispersed liquid present in the continuous oil phase, which method involves the use of spaced electrodes providing a test space therebetween, said method including the steps of: mixing said emulsion to further subdivide said dispersed droplets of liquid and stabilize said emulsion against coalescing and settling of the resulting droplets when subjected to a high frequency electric field; disposing the mixed emulsion in said test space; and measuring the capacitive reactance of said emulsion in said test space as a measure of the amount of dispersed liquid in said oil phase by impressing on the emulsion in said test space a high frequency electric field.

2. A method for testing oil-continuous emulsions containing dispersed droplets of liquid to determine the amount of dispersed liquid present in the continuous oil phase, which method involves the use of spaced electrodes providing electrically conducting surfaces bounding a test space, said method including the steps of: subjecting a stream of said emulsion to an intensive mixing action to reduce the particle size of said dispersed droplets of liquid; continuously flowing the resulting stream of emulsion into one portion of said test space and from another portion of said test space, said emulsion flowing through said test space in bridging relationship with said conducting surfaces; applying to said electrodes a high frequency alternating potential, said mixing of said emulsion before it enters said test space aiding in stabilizing said emulsion to prevent substantial separation of said dispersed droplets of liquid from said oil phase while in said test space; and measuring changes in capacitive reactance of said emulsion in said test space as a measure of change in the amount of dispersed liquid in said emulsion.

3. A method for testing oil-continuous emulsions containing dispersed droplets of liquid to determine the amount of dispersed liquid present in the continuous oil phase, which method involves the use of spaced electrodes providing surfaces bounding a test space, said method including the steps of: withdrawing from a source of said emulsion a first stream thereof and continuously flowing said first stream into one portion of said test space and from another portion of said test space; applying to said electrodes a high frequency alternating potential and measuring the capacitive reactance of said first stream of emulsion in said test space as a measure of the amount of dispersed liquid therein; withdrawing from said source of emulsion a second emulsion stream; purifying said second emulsion stream to remove substantially all of the dispersed droplets of liquid therefrom; continuously flowing the purified second stream through another test space; applying across said other test space a high frequency alternating potential of the same frequency as applied to said electrodes of said first-named test space to measure the capacitive reactance of said purified stream; and comparing the capacitive reactances of said purified stream and said first stream of emulsion as a measure of the amount of dispersed droplets of liquid in said first stream of emulsion.

4. In an apparatus for testing oil-continuous emulsions containing dispersed droplets of liquid to determine the amount of said liquid dispersed in the oil phase, the combination of: a capacitive test cell providing spaced electrode means having conducting surfaces defining a first test space adapted to contain said emulsion in bridging relationship with said conducting surfaces; means for electrically insulating said electrode means from each other; other electrode means forming a part of said test cell and providing conducting surfaces spaced from each other to define an oil space, said oil space and said test space being separated by one of said electrode means and this electrode means being of high heat conductivity to equalize the temperatures in said spaces, said oil space being adapted to contain a body of oil containing substantially none of said dispersed liquid; means for electrically insulating said other electrodes from each other; means for energizing said electrode means of said test space and said electrode means of said oil space with an alternating potential of sufficiently high frequency that the capacitive current through the emulsion in said test space is high relative to the resistive current through this emulsion, said frequency being between about 100,000 cycles and about 6 megacycles; and means for balancing against each other the capacitive reactance of the oil in said oil space and the emulsion in said test space to produce an electrical output dependent upon the capacitive reactance of the emulsion in said test space, said electrical output being a measure of the amount of said dispersed liquid in said emulsion in said test space.

5. In an apparatus for testing oil-continuous emulsions containing dispersed droplets of liquid to determine the amount of said liquid dispersed in the oil phase, the combination of: a capacitive cell providing spaced electrode means forming a test space, said test space having entrance and exit portions, said electrode means being adapted to be energized by a source of high frequency potential; emulsion delivery means for delivering to said entrance portion a stream of said emulsion for continuous flow through said test space and from said exit portion thereof; means for measuring changes in capacitive reactance of said emulsion in said test space, said changes being a measure of the amount of dispersed liquid in the oil phase of said emulsion; and means for intimately mixing said emulsion before delivery to said entrance portion to reduce the particle size of said dispersed droplets of liquid and further stabilize said emulsion to prevent substantial separation of said dispersed droplets of liquid from said oil phase while in said test space.

6. In an apparatus for testing oil-continuous emulsions containing dispersed droplets of liquid to determine the amount of said liquid dispersed in the oil phase, the combination of: a capacitive test cell providing spaced electrode means defining a first test space; means for electrically insulating said electrode means from each other; pipe means for continuously delivering to said first test space a stream of said emulsion; other electrode means forming a part of said test cell and providing conducting surfaces spaced from each other to define an oil space, said oil space and said test space being separated by one of said electrode means, this electrode means being of high heat conductivity to equalize the temperatures in said spaces; means for electrically insulating said other electrodes from each other; a small pipe for continuously bleeding from said pipe means a small stream of said emulsion; a purifying means communicating with said small pipe and including means for removing from said small stream of emulsion substantially all of the dispersed liquid therein to produce a small stream of purified oil; means for delivering said small stream of purified oil to said oil space; means for energizing said electrode means of said test space and said electrode means of said oil space with a high frequency alternating potential; and means for comparing the capacitive reactance of the oil in said oil space and the emulsion in said test space as a measure of the amount of said dispersed liquid in said emulsion in said test space.

7. In a method for testing stable oil-continuous emulsions containing dispersed droplets of an aqueous liquid in small amounts up to 2% in the oil phase thereof to determine the amount of said aqueous liquid therein, the steps of: disposing the emulsion in a test space, generating an alternating potential at such a high frequency that the capacitive current through said emulsion is high relative to the resistive current therethrough, applying said potential across said test space, and measuring the capacitive reactance of said emulsion in said test space as a measure of the amount of said aqueous liquid dispersed in the oil phase.

8. A method as defined in claim 7 including the further steps of: establishing a body of dry oil, measuring the capacitive reactance of said body at said high frequency, and balancing the capacitive reactance of said body against the capacitive reactance of said emulsion in said test space.

9. A method as defined in claim 7 including the step of applying said high frequency potential directly to said emulsion in said test space in conductive relation thereto.

10. A method as defined in claim 7 wherein the frequency of said alternating potential is between about 100,000 cycles and about 6 megacycles.

11. In an apparatus for testing the capacitive reactance of liquids to determine the amount of a component thereof, the combination of: a capacitive cell providing spaced electrode means defining a test space adapted to contain said liquid; means for electrically insulating said electrode means from each other; a capacitance bridge providing a plurality of capacitive arms and providing input and output terminals; means for connecting said electrode means in one of said arms; and means for applying across said input terminals of said bridge a high-frequency alternating voltage, said last named means including an oscillator having a tank circuit and means for connecting said input terminals of said bridge in said tank circuit whereby said bridge acts as a capacitor for said tank circuit, the potential across said output terminals being responsive to the capacitive reactance of said liquid in said test space and being a measure of the amount of said component in said liquid.

12. In an apparatus for testing oil-continuous emulsions containing dispersed droplets of liquid to determine the amount of said liquid dispersed in the oil phase, the combination of: a capacitive cell providing spaced electrode means having conducting surfaces defining a test space adapted to contain said emulsion in bridging relationship with said conducting surfaces; means for electrically insulating said electrode means from each other; a capacitance bridge providing a plurality of capacitive arms and providing input and output terminals; means for connecting said electrode means in one of said arms; and means for applying across said input terminals of said bridge a high frequency alternating voltage, the potential across said output terminals being responsive to the capacitive reactance of said emulsion in said test space and being a measure of the amount of dispersed liquid in the oil phase of said emulsion, said means for applying said high frequency alternating voltage to said bridge comprising an oscillator having a tank circuit, and means for connecting said input terminals of said bridge in said tank circuit whereby said bridge acts as a capacitor for said tank circuit.

ROBERT A. ROBINSON.
WILLIAM F. EBERZ.

REFERENCES CITED

The following references are of record in the file of this patent:

UNITED STATES PATENTS

| Number | Name | Date |
| --- | --- | --- |
| 1,870,282 | Cover | Aug. 9, 1932 |
| 2,068,499 | Mackenzie | Jan. 19, 1937 |
| 2,071,607 | Bjorndal | Feb. 23, 1937 |
| 2,108,580 | Drake et al. | Feb. 15, 1938 |
| 2,122,578 | McMaster et al. | July 5, 1938 |
| 2,177,528 | Kidd | Oct. 24, 1939 |
| 2,178,471 | De Bruin | Oct. 31, 1939 |
| 2,219,497 | Stevens et al. | Oct. 29, 1940 |
| 2,251,641 | Stein | Aug. 5, 1941 |
| 2,266,114 | Bartlett | Dec. 16, 1941 |
| 2,285,152 | Firestone | June 2, 1942 |
| 2,304,448 | Fletcher | Dec. 8, 1942 |
| 2,349,992 | Schrader | May 30, 1944 |
| 2,370,609 | Wilson et al. | Feb. 27, 1945 |
| 2,396,934 | Wallace | Mar. 19, 1946 |
| 2,422,873 | Wolfner | June 24, 1947 |
| 2,485,579 | Elliott | Oct. 25, 1949 |

FOREIGN PATENTS

| Number | Country | Date |
| --- | --- | --- |
| 47,417 | Denmark | May 27, 1933 |